United States Patent [19]
Goke et al.

[11] Patent Number: 5,146,455
[45] Date of Patent: Sep. 8, 1992

[54] WIDE RANGE MIXED RATE TDM BUS USING A MULTIPLE OF TIME SLOT INTERCHANGE CIRCUIT SWITCHES

[75] Inventors: Louis R. Goke, Austin, Tex.; Gary J. Grimes, Thornton, Colo.

[73] Assignee: AT&T Bell Laboratories, Murray Hill, N.J.

[21] Appl. No.: 628,780

[22] Filed: Dec. 17, 1990

[51] Int. Cl.$^5$ ............................................. H04L 27/04
[52] U.S. Cl. ........................................ 370/68; 370/66; 370/84
[58] Field of Search ...................... 370/84, 66, 68, 112, 370/58.1, 58.2, 58.3, 67, 63, 64

[56] References Cited

U.S. PATENT DOCUMENTS

| | | | |
|---|---|---|---|
| 4,298,977 | 11/1981 | Abbott et al. | 370/68 |
| 4,680,752 | 7/1987 | Takemura et al. | 370/68 |
| 4,855,996 | 8/1989 | Douskalis | 370/84 |
| 4,885,741 | 12/1989 | Douskalis | 370/84 |

Primary Examiner—Douglas W. Olms
Assistant Examiner—Shick Hom
Attorney, Agent, or Firm—John C. Moran

[57] ABSTRACT

A time slot converter for communicating multi-rate data on a single channel by using multiple time slots. By utilizing multiple replications of the time slot converter, any size time division switching unit such as time slot interchangers or time multiplexer switches may be assembled. The time slot converter has a plurality of switching elements and a switching element uses a time accounting arrangement that has the same overhead in assigning multiple time slots to a channel as in assigning one time slot to a channel. The switching element requires less buffer storage because each time slot has only one bit, and it is not necessary to store multiple frames. In addition, switching delay is reduced, since the delay due to buffering is always less than a frame period. Data order is maintained by using time slots for high capacity channels that are equally spaced in time and whose order is guaranteed. Also, the utlization of equally spaced time slots eliminates the need for output and input buffering to and from endpoint terminals.

66 Claims, 5 Drawing Sheets

| STATE | A | B |
|---|---|---|
| X DON'T CARE | 1 | 1 |
| 1 | 1 | 0 |
| 0 | 0 | 1 |

| | A3 | B3 | A2 | B2 | A1 | B1 | A0 | B0 |
|---|---|---|---|---|---|---|---|---|
| 601 | 1 | 1 | 1 | 1 | 1 | 1 | 0 | 1 |
| 602 | 1 | 1 | 1 | 1 | 1 | 1 | 1 | 0 |
| 603 | 1 | 1 | 1 | 1 | 0 | 1 | 1 | 0 |
| 604 | 1 | 1 | 1 | 1 | 0 | 1 | 0 | 1 |
| 605 | 1 | 0 | 0 | 1 | 1 | 0 | 0 | 1 |
| 606 | 1 | 0 | 1 | 0 | 1 | 0 | 0 | 1 |

CONTENTS OF FLIP FLOPS OF FIG. 8

| | 801 | 802 | 803 | 804 | 805 |
|---|---|---|---|---|---|
| 901 | 0 | 0 | 0 | 1 | 0 |
| 902 | 1 | 1 | 0 | 1 | 0 |
| 903 | 0 | 0 | 1 | 0 | 1 |

WIDE RANGE MIXED RATE TDM BUS USING A MULTIPLE OF TIME SLOT INTERCHANGE CIRCUIT SWITCHES

TECHNICAL FIELD

This invention relates to communication systems and, in particular, for providing multiple rate communication channels.

BACKGROUND OF THE INVENTION

In the information age, there is an increasing need to transmit large quantities of information among a multitude of different types of customer terminals. Also, large telecommunication switching systems are expected to switch many types of information in addition to voice. The data rates for these different types of terminals range from 1.2 kb/s (e.g. computer terminal) to 8000 kb/s (e.g. video). In order to communicate such a wide range of data rates, some prior art telecommunication systems have used a circuit switch for switching voice, a packet switch for switching bursty type data, and a video switch for switching video. However, a packet switch is only a partial solution for switching bursty type data because some applications have critical delay requirements that are difficult to guarantee with packet switches. Further, the use of these different types of switches adds to the cost and complexity of administrating a telecommunication system.

The switching architecture of a prior art telecommunication switching system for circuit switching voice and certain other types of data is illustrated in FIG. 1. This system is similar to the AT&T 5ESS Switching System described in the *AT&T Technical Journal*, Volume 64, July-August, 1985, No. 6, Part 2. Not shown in FIG. 1 is the control circuitry to perform the necessary control functions. As described in the AT&T Technical Journal data is communicated within this prior art system by time division multiplexing data into "channels" with each channel comprising one or more time slots. The time slots are grouped into "frames". In the illustrated system, there are 512 time slots per frame, and each time slot can communicate data at 64 kb/s. In principle, the illustrated system can be used for channels having data rates higher than 64 kb/s by assigning multiple time slots to each channel. Since, a time slot is the smallest allocatable unit of channel capacity, different numbers of time slots may be assigned to channels with different capacity requirements; however, the data rate of a channel cannot be less than the data rate of single channel.

There are four problems that make prior art switching systems impractical for channels with numerous time slots: (1) time slot accounting, (2) buffer storage requirements, (3) switching delays, and (4) data order integrity. The time slot accounting problem results because any combination of time slots may be allocated to any channel and each time slot requires individual processing during allocation. As more time slots are allocated to a channel, more memory space is required in a switching unit (e.g. a time multiplexer switch) to keep track of which time slots are allocated to the channel. Also, more time is required for a control algorithm to set up the channel. This additional channel setup time is an important consideration in a large switching unit such as the time multiplexer switch of the AT&T 5ESS Switching System.

The buffer storage problem results because prior art switching systems require sufficient buffer storage in each switching unit (e.g. time slot multiplexers, time slot demultiplexers, and time multiplexer switch) to store two frames of time slots. Hence, any channel that uses a large number of time slots consumes a proportionately large amount of buffer memory space. In addition, buffer memories of this type must have very fast access times even when 8 bits of data are included in each time slot. If the number of bits of data per time slot is reduced, the access time of these buffer memories proportionately increases.

The switching delay problem results because prior art switching systems introduce delay in multiples of a frame period. Normally, this delay is equal to five frame periods for a prior art switching system and is due to the need to fully buffer the frames at each input and output stage of each switching unit.

In most prior art switching systems, the data ordering problem requires consecutive time slots for a multi-time slot channel in order to guarantee that data will not be reordered as the data is transferred through various buffer storage units. The result is that information is received from these time slots at high burst rates and must be buffered so that the data can be transferred at a steady rate to a receiving terminal. Similarly, data received at a steady rate from the terminal must be buffered in order to be placed in the consecutive time slots.

Each of the above four problems is a function of the number of time slots allocated to a channel and is not a function of channel capacity. As long as sufficiently fast circuitry is available and the channel capacity equals an individual time slot, conventional time division switching principles can be used without the above problems becoming effective. If different channel capacities are required particularly for other than multiples of 64 kb/s, then the above problems become effective.

U.S. Pat. No. 4,855,996 discloses a small telecommunication switching system that solves the aforementioned data ordering problem but implements only one time division bus as illustrated in FIG. 1. Further, the buffer storage and switching delay problems never occur in such a small switching system because it has only one time division bus. Also, the time slot accounting problem is not solved by the disclosed method. (Note U.S. Pat. No. 4,855,996 refers to time slots as access times and to channels as time slots.) The time slot accounting problem is not solved by the disclosed method because each of the time slots requires a memory word in a central memory and must be individually assigned to a channel. To handle terminals transmitting at different data rates, this patent discloses a method that determines the number of time slots per frame and the number of time slots to be assigned to each channel for a specified data rate. In addition, the method determines the time slots for a given channel so that those time slots are evenly spaced throughout the frame.

SUMMARY OF THE INVENTION

The foregoing problems are solved and a technical advance is achieved by a time slot converter comprising a plurality of switching and control elements. When replicated and interconnected, the time slot converter is used to implement switching units (i.e. time slot multiplexers, time slot demultiplexers, and time multiplexer switches). These switching units form a telecommunication system capable of efficiently and economically circuit switching a wide range of data rates. Switching units utilizing the time slot converter avoid the time slot accounting problem because the time slot converter has the same overhead when assigning multiple time slots per channel as when assigning one time slot per channel. Advantageously, the buffer storage problem is greatly reduced because it is unnecessary to store multiple frames in each switching unit. In one embodiment, the buffer storage problem is further reduced because each time slot has only one bit; hence, each stage of a switching system needs only a single bit of buffering per channel rather than multiple binary words per channel as required in the prior art systems. In addition, switching delay is reduced, since the delay due to buffering is always less than a frame period. Also, the problem of maintaining data order is eliminated by using time slots for high capacity channels that are equally spaced in time and whose order is guaranteed. Finally, the utilization of equally spaced time slots eliminates the need for input and output buffering to and from endpoint terminals.

Internally, each switching element transfers data from one or a plurality of input time slots of a time frame to the same number of output time slots. The input time slots are received on an input communication bus, and the output time slots are transmitted on an output communication bus. Each time slot is identified by a time slot number, and an input address register stores a single input address word capable of designating one or a plurality of input time slots whose data is to be switched to output time slots. The data from the input communication bus for all designated input time slots is stored in a buffer which has buffering capacity for storing data from only one time slot at a time. Similarly, an output address register stores a single output address word capable of designating one or a plurality of output time slots that are to receive the data stored in the buffer. As each output time slot is designated, the data stored in the buffer is inserted into the designated output time slot on the output communication bus.

In one embodiment, the input address register has a plurality of address positions, each storing one of three states. The time slot number has a plurality of address positions, each indicating one of two states. In designating input time slots, the switching element individually matches each of the first two states of the input address register with one of the two states of the time slot number and matches the third state of the input address register with either of the two states of the time slot number. The switching element functions in the same manner with respect to the output address register which also has a plurality of address positions, each storing one of three states.

In another embodiment, the input address register generates a plurality of bit pairs, each defining one of three states by using a storage buffer and a logic circuit. The storage buffer stores one bit for each bit pair plus a significant bit defining the third state. In response to the most significant bit having a predefined state, the logic circuit generates the third state for each bit pair. Each bit pair corresponds to the sequential bit position of the storage buffer starting from the significant bit until a bit position is encountered not storing the predefined state. After encountering such a bit position, the logic circuit generates for each bit pair (corresponding to the remaining bit positions) the state stored in each. The significant bit can be either the most or least significant bit. The output address register functions in the same manner.

Other and further aspects of the present invention will become apparent during the course of the following description and by reference to the accompany drawing.

DETAILED DESCRIPTION

Figure 1:
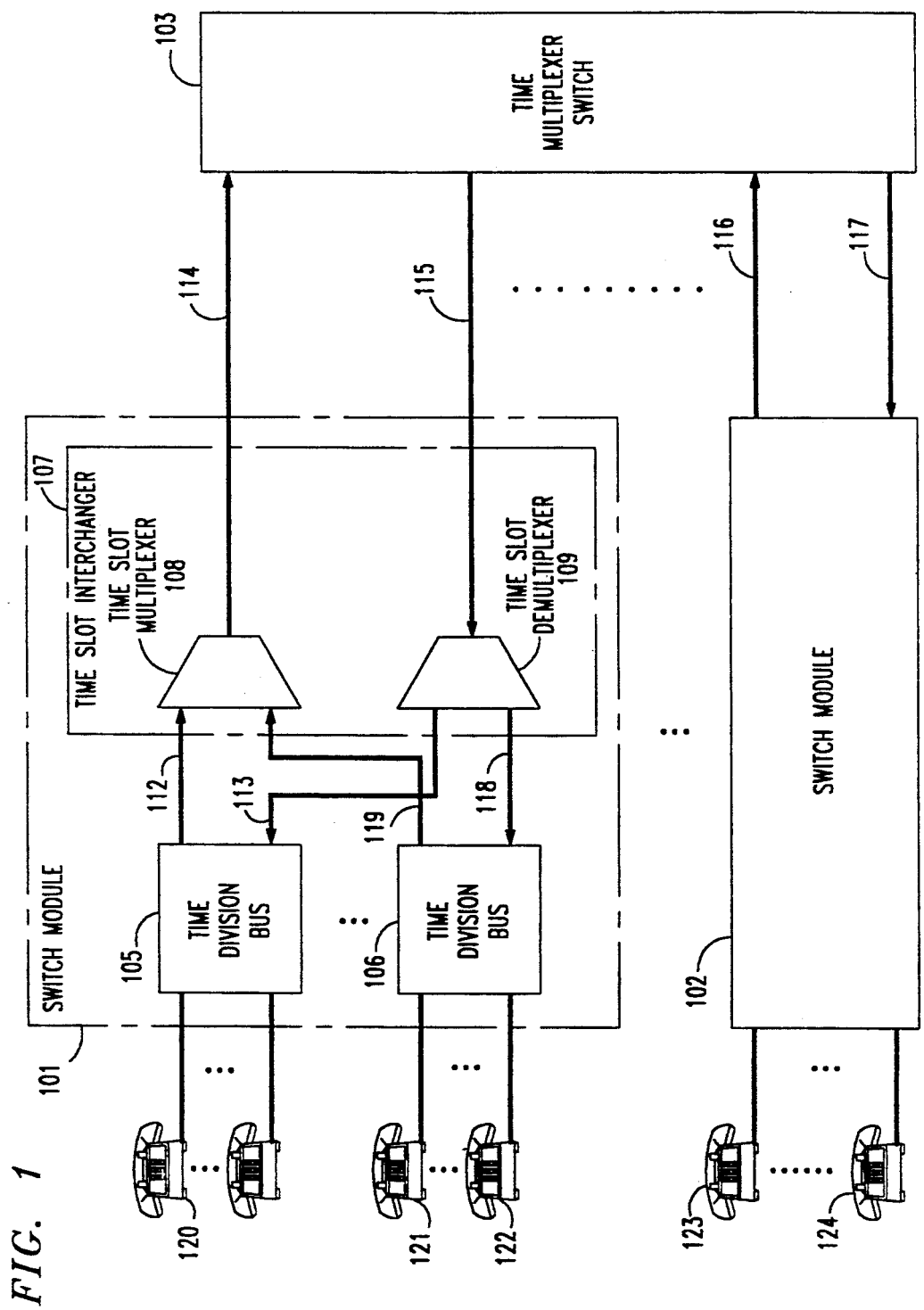
FIG. 1 illustrates a prior art time division switching system.

The prior art system of FIG. 1 is now explained in greater detail in order to establish a basis for describing how the present invention solves the problems of such prior art systems. Switch modules 101 through 102 are identical. Switch module 101 comprises 32 time division buses (e.g. buses 105 through 106) and time slot interchanger 107 comprising time slot multiplexer 108 and time slot demultiplexer 109. Time slot interchanger 107 receives 32 time slots per frame from each of time division buses 105 through 106 with each time slot potentially carrying information from telephones 120 through 122. In addition to the latter telephones, other types of customer terminals may also be terminated on each time division bus. Each time slot communicates 8 bits of data at 64 kb/s. In return, time slot interchanger 107 transmits 32 time slots per frame to each time division bus.

Time slot interchanger 107 is receiving a total of 1,224 time slots from time division buses 105 through 106; and time slot interchanger 107 selects and arranges 512 of these time slots for transmission to time multiplexer switch 103 via path 114. Similarly, the time slot interchangers in the other switch modules, such as switch module 102, are also transmitting 512 time slots to time multiplexer switch 103. In prior art systems, time slot multiplexer 108 and time slot demultiplexer 109 must both have a pair of high speed buffer memories each capable of storing data from 1,224 time slots. Similarly, for each path (e.g., path 114) connected to time multiplexer switch 103, that switch must have a pair of high speed buffer memories capable of storing data from 1,224 time slots. Each pair of buffer memories must have a control memory storing 1,224 control words. These control memories are administrated by a central control unit which is not illustrated in FIG. 1.

Some of the time slots transmitted by switch module 101 to time multiplexer switch 103 return via communication path 115 since these time slots are being utilized by telephone calls within switch module 101. An example is a telephone call set up from telephone 120 attached to time division bus 105 to telephone 121 attached to time division bus 106. Another time slot transmitted via path 114 may be part of a telephone call from telephone 122 to telephone 123 attached to switch module 102. To handle such a call, time multiplexer switch 103 transfers a time slot received on communication path 114 to the appropriate time slot being transmitted from time multiplexer switch 103.

Figure 2:
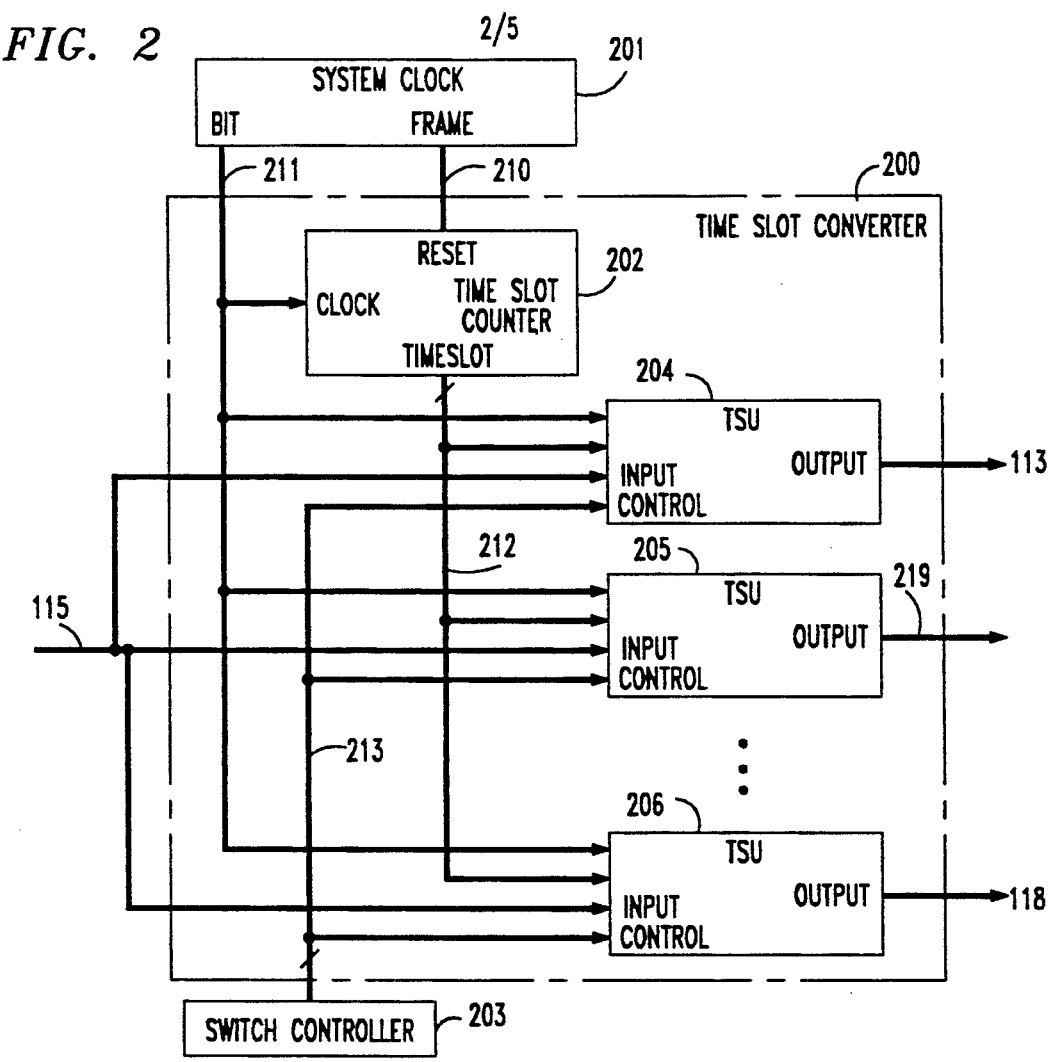
FIG. 2 illustrates a time slot converter configured as a time slot demultiplexer.
Figure 3:
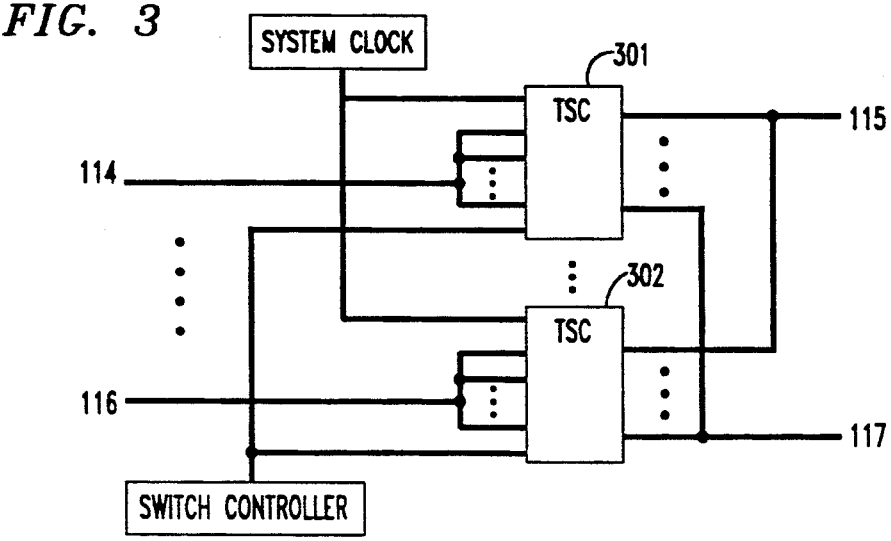
FIG. 3 illustrates a plurality of time slot converters configured as a time multiplexer switch in accordance with the invention.
Figure 4:
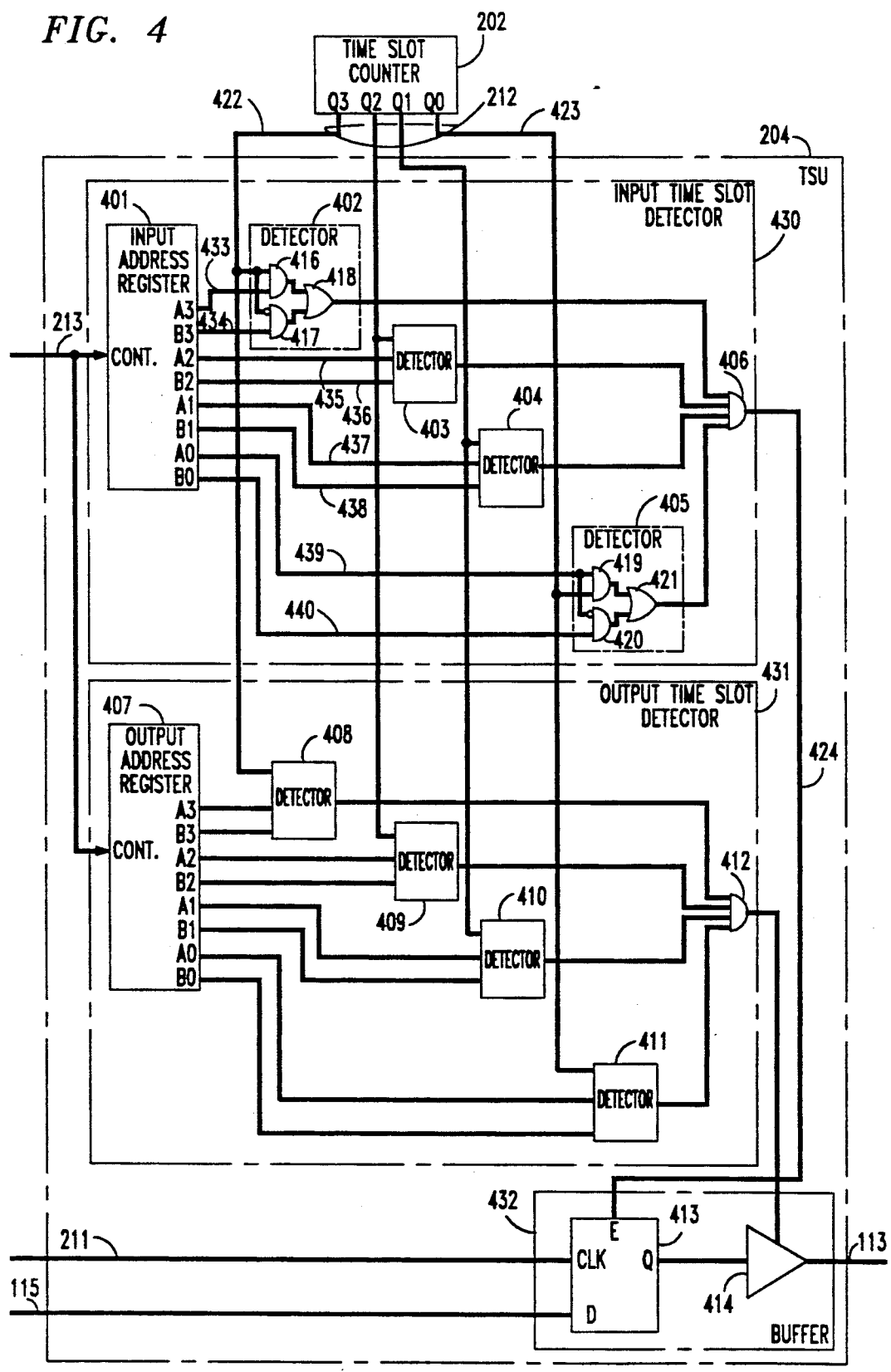
FIG. 4 illustrates in greater detail a time slot unit.
Figure 7:
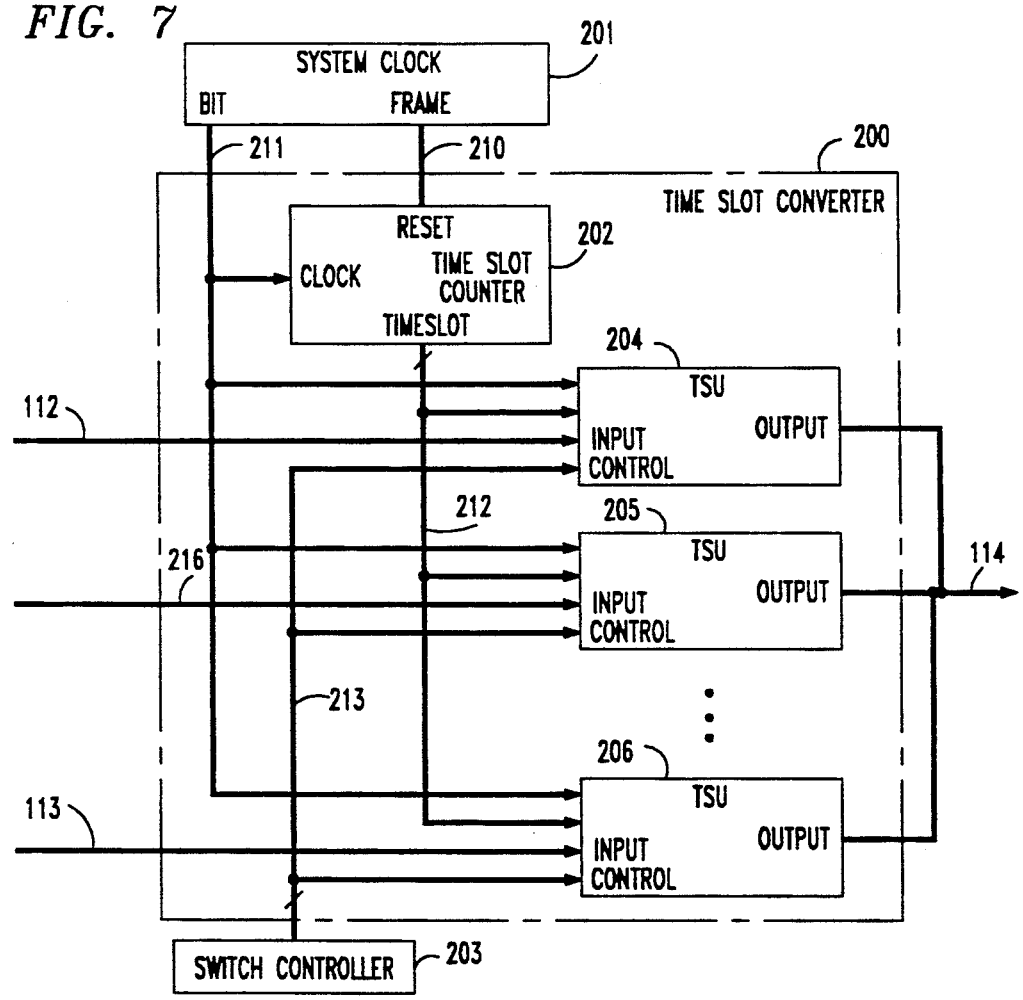
FIG. 7 illustrates a time slot converter configured as a time slot multiplexer.

Consider now in detail how the present invention solves the problems of prior art switching systems such as the one illustrated in FIG. 1. In accordance with the invention, as illustrated in FIG. 2, time slot converter 200 is interconnected to perform the functions of a time slot demultiplexer, such as demultiplexer 109. FIG. 7 illustrates time slot converter 200 interconnected to perform the function of a time slot multiplexer, such as multiplexer 108. FIG. 3 illustrates replications of time slot converter 200 interconnected to perform the functions of time multiplexer switch 103. Whether time slot converter 200 switches one or two bits per frame depends on which embodiment of a time slot unit is used. In a first embodiment of a time slot unit as illustrated in FIG. 4, time slot converter 200 functions with time slots containing only one bit. However, a second embodiment of a time slot unit is described with respect to FIG. 10 using a plurality of bits per time slot. In the first embodiment, for each bit received via data path 115, time slot converter 200 transmits the received bit in a different time slot on one of output lines 113 through 118 via time slot units 204 through 206, respectively. Further, in accordance with the invention, a time slot unit is the basic switching element. In response to an input address word and an output address word each time slot unit is capable of switching from one bit per frame up to all bits per frame to the time slot unit's output path in powers of two combinations. In addition, these bits are evenly spaced throughout the frame period and across multiple frame periods. For example, time slot unit 204 can switch to output path 113 one bit, two bits, four bits, eight bits, etc. Each of time slot units 204 through 206 has one bit of storage and is capable of recognizing and switching multiple time slots. Further, even when switching multiple time slots, the time slot unit guarantees that no data reordering occurs. Advantageously, each time slot unit has an internal structure that lends itself to being implemented in large scale integrated (LSI) circuits. Time slot converter 200 can be implemented as one integrated circuit with multiple time slot units.

FIG. 1 illustrates the prior art in time division switching where each time slot is switched to a unique terminal, (e.g. telephone 120). However, if a terminal is to receive a plurality of time slots, then the terminal must have multiple connections to a time division bus, e.g. time division bus 106. In addition to having multiple connections, the terminal must buffer the data because it is received in data bursts. In accordance with the invention, implementing time slot demultiplexer 109 utilizing time slot converter 200 allows for greater flexibility in the number of time slots that a terminal can receive while still having only one connection to a time division bus. For example, consider the system where switch module 101 consists of time division bus 105 having a plurality of attached telephones and a high capacity wideband terminal replacing time division bus 106. Further, this wideband terminal requires half of the bandwidth of communication paths 114 and 115. The time slot demultiplexer illustrated in FIG. 2 easily accommodates this allocation of bandwidth and only requires the utilization of time slot units 204 and 206. Time slot unit 204 performs the normal time slot multiplexing function from communication path 115 to 113; whereas, time slot unit 206 is responsive to half the time slots in any given frame arriving on communication path 115 to transfer those time slots in new time slot positions to path 113 which terminates on the wideband terminal. Since the time slots are evenly spaced, the wideband terminal directly utilizes this data without having to buffer the data. As required, multiple replications of time slot converter 200 can be utilized to construct a time slot demultiplexer of any size.

FIG. 3 illustrates an implementation of time multiplexer switch 103 utilizing multiple replications of time slot converter 200. Time slot converters 301 through 302 function on the basis of one bit time slots; each of the time slot converters is capable of transferring and rearranging any multiple of time slot bits from an incoming communication path to an outgoing communication path in any combination denoted by powers of two. For example, time slot converter 301 can transfer half of the incoming time slots from path 114 to path 115 and the other half of the incoming time slots from communication path 114 to communication path 117. To implement this example, time slot converter 301 requires only two time slot units. The maximum number of time slot units required by time multiplexer switch 101 equals the number of time slots; but in accordance with the invention, each of these time slot units is a very simple circuit as illustrated in FIG. 4.

FIG. 7 illustrates time slot converter 200 configured to be a time slot multiplexer such as time slot multiplexer 108 of FIG. 1. In accordance with the invention, the information received from time slots communicated via conductors 112 through 113 is transferred to outgoing time slots communicated via conductor 114. The time slot units illustrated in FIG. 7 have the same construction as the time slot unit of FIG. 4.

Different implementations of the switching system of FIG. 1 (based on time slot converter 200) have different numbers of time slots. Consider two such implementations that have the same bandwidth as previously discussed between time slot interchangers 101 through 102 and time multiplexer 103. A first implementation has 512 time slots in a frame with a frame interval of 15.6 microseconds. This transmission rate allows one time slot to transport one 64 kb/s channel. Higher rate channels are in multiples of 64 kb/s. A second implementation has 4096 time slots per frame with a frame interval of 125 microseconds. The second implementation requires 8 time slots for a 64 kb/s channel, but can communicate an 8 kb/s channel, such as an 8 kb/s compressed voice channel or a D channel of a Basic Rate Interface, in only one time slot. To communicate 32 kb/s compressed voice channel, the second implementation utilizes 4 time slots. An 8000 kb/s video channel requires 1000 time slots.

Time slot unit 204 is illustrated in greater detail in FIG. 4. For simplicity, time slot unit 204 is illustrated for switching sixteen time slots. Time slot unit 204 has three major units. The first unit is input time slot detection unit 430 comprising blocks 401 through 406, the second unit is output time slot detection unit 431 comprising blocks 407 through 412, and the third unit is a one bit buffer that is designated buffer unit 432 comprising blocks 413 and 414. Input time slot detection unit 430 detects the time slot whose bit is to be stored in buffer 432; output time slot detection unit 431 detects the time slot to receive the contents of buffer unit 432.

Figures 5, 6, 9, 10:
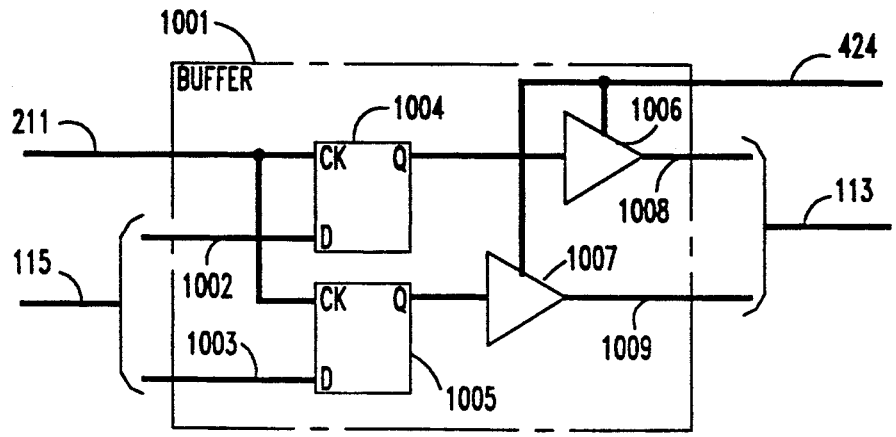
FIGS. 5 and 6 illustrate tables that describe the operation of a time slot unit.
FIG. 9 illustrates a table utilized to describe the operation of the address register of FIG. 8.
FIG. 10 illustrates a second embodiment of a buffer circuit.

The input and output address detection units are based on a three state addressing method. Consequently, registers 401 and 407 utilize two bits to represent the state of each bit of the input address and the output address. This encoding scheme is illustrated in FIG. 5. To understand the operation of time slot unit 204 with respect to this encoding scheme, consider the following examples that illustrate how any combination (denoted by powers of two) of time slot bits can be switched. First, time slot unit 204 switches the bits of odd time slots 1, 3, 5, 7, 9, 11, 13, and 15 from path 115 to even time slots 0, 2, 4, 6, 8, 10, 12, and 14 of path 113. In accordance with the invention, these bits are evenly spaced and the bit ordering is preserved. In order to detect the odd time slots, input address register 401 is loaded with the bits illustrated in line 601 of FIG. 6 by the switch controller via cable 213. Similarly, output address register 407 is loaded with the bits illustrated in line 602. Detectors 402 through 405 and 408 through 411 are identical. Detectors 402 and 405 illustrate the details of these detectors.

In input time slot detection unit 430, each detector 402 through 405 detects a particular bit from time slot counter 202. For example, detector 402 detects the most significant bit, Q3, from time slot counter 202; whereas, detector 405 detects the least significant bit, Q0. For a given time slot to be matched, each of detectors 402 through 405 must detect that its bit of register 401 matches the corresponding bit of time slot counter 202. Upon detecting a match, each detector transmits a "1" to AND gate 406. If each detector is transmitting a "1", AND gate 406 enables the storing of a bit in flipflop 413 by transmitting a signal on conductor 211.

When the bits illustrated in line 601 of FIG. 6 are stored in register 401, detector 402 is responsive to either a "1" or a "0" on conductor 422 to transmit a "1" to AND gate 406. If the signal transmitted on conductor 422 is a "1", AND gate 416 transmits a "1" to OR gate 418 which in turn transmits a "1" to AND gate 406. If the signal transmitted on conductor 422 is a "0", gate 417 transmits a "1" to OR gate 418. Since detectors 402 through 404 are responsive to either a "1" or "0" being received from counter 202, these detectors also transmit "1s" to AND gate 406. In response to the contents of register 401 containing the bits illustrated in line 601, detector 405 detects a three state 0 in the following manner. If a "1" is being transmitted on conductor 423, the output of the least significant bit position of time slot counter 202, both gates 419 and 420 transmit "0s" to OR gate 421 which in turn transmits a "0" to AND gate 406 resulting in the transmission of a "0" to flipflop 413 via conductor 424. When a "0" is transmitted via conductor 423, gate 420 transmits a "1" to OR gate 421. In response to the "1" OR gate 421 transmits a "1" to AND gate 406. AND gate 406 is responsive to the "1s" from detectors 402 through 405 to transmit a "1" to flipflop 413 via conductor 424.

Output time slot detection unit 431 operates in a similar manner to detect the odd time slots. As each odd time slot is detected by detectors 408 through 411, AND gate 412 transmits a "1" to output buffer 414 which places the contents of flipflop 413 onto path 113.

A second example is where the bits of time slots 1, 5, 9, and 13 are to be transferred from path 115 to the time slots of 0, 4, 8, and 12. Line 603 of FIG. 6 illustrates the contents of register 401, and line 604 illustrates the contents of register 407 to perform this switching. Whenever multiple time slot channels are switched, the time slots are automatically evenly spaced to minimize storage and delay problems. A third example is where the bit of time slot 10 is to be switched from path 115 to the bit of time slot 14 on path 113. The contents of registers 401 and 407 that perform this switching function are illustrated in lines 605 and 606, respectively, of FIG. 6.

Figure 8:
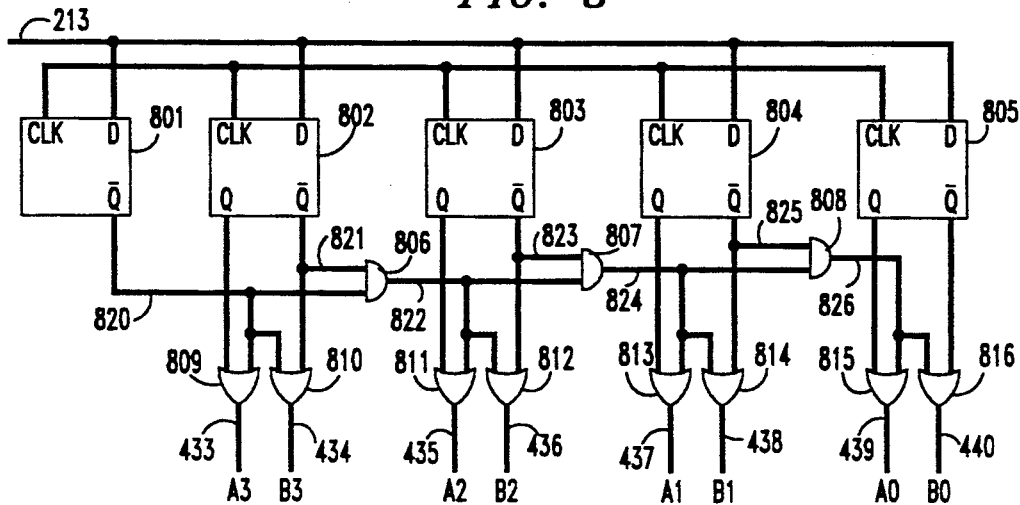
FIG. 8 illustrates a second embodiment of an address register.

Input address register 401 and output address register 407 of FIG. 4 can be implemented using one flipflop per output conductor, e.g. conductors 433 through 440 for register 401. An alternate embodiment for register 401 is illustrated in FIG. 8. A similar circuit could also be used to implement register 407. The advantage of register 401 as illustrated in FIG. 8 is the reduction in the number of flipflops needed to provided the outputs of register 401. Register 401 of FIG. 8 reduces the number of flipflops from "2 m" to "m+1" where "m" is the number of outputs. Flipflops 801 through 805 are loaded from cable 213 of FIG. 4. Consider the operation of register 401 in implementing the previous examples with respect to the table illustrated in FIG. 6. To generate the outputs illustrated in line 601 of FIG. 6, flipflops 801 through 805 store the bits illustrated in line 901 of FIG. 9. Register 401 functions by AND gates 806 through 808 providing feedback from a most significant flipflop to a least significant flipflop. If all of the preceding most significant flipflops contain a "0" before a particular flipflop, then, the outputs controlled by that flipflop will be the don't care outputs, i.e. A=1 and B=1. For example, with flipflops 801 through 805 storing the bits indicated in line 901, the output of flipflop 801 on conductor 820 causes OR gates 809 and 810 both to generate a "1". Further, AND gates 806 and 807 cause OR gates 811 through 814 to generate "1s". However, flipflop 804 stores a "1" and generates a "0" on conductor 825, which in turn causes AND gate 808 to generate a "0" on conductor 826. In response to the "0" on conductor 826, OR gates 815 and 816 reflect the state of flipflop 805 on conductors 439 and 440. In the present example, flipflop 805 stores a "0", OR gate 815 transmits a "0" on conductor 439, and OR gate 816 transmits a "1" on conductor 440.

Consider now the example of line 605 of FIG. 6. To generate line 605, register 401 of FIG. 8 stores the bits illustrated in line 902 of FIG. 9. Since flipflop 801 stores a "1", that flipflop transmits a "0" on conductor 820, which results in AND gates 806 through 808 generating "0" on conductors 822 through 826, respectively. The result is that each pair of OR gates 809 through 816 reflect the state of their associated flipflop to the associated output conductors. For example, OR gates 813 and 814 reflect the state of flipflop 804 to output conductors 437 and 438. Another example is line 603 which requires that flipflops 801 through 805 store the bits illustrated on line 903.

In a second embodiment, time slot converter 200 switches time slots with each time slot having two binary bits of data. To implement the switching of such time slots, paths 215 through 220 communicate two parallel bits of data, and buffer 432 of FIG. 4 is replaced by buffer 1001 of FIG. 10. From path 215, the two bits are transmitted on conductors 1002 and 1003 and are clocked into flipflops 1004 and 1005 under control of a signal on conductor 211. The generation of that signal was previously described with respect to FIG. 4. The contents of flipflops 1004 and 1005 are transmitted to path 218 via output buffers 1006 and 1007 and conductors 1008 and 1009 under control of a signal on conductor 424. The generation of that signal was previously described with respect to FIG. 4.

It is to be understood that the above-described embodiments are merely illustrative of the principles of the invention and that other arrangements may be devised by those skilled in the art without departing from the spirit and scope of the invention.

We claim:

1. An apparatus for transferring data from input time slots to output time slots with said input time slots and said output time slots being identified by time slots numbers, said apparatus comprising:

means for generating time slot numbers to identify said input and output time slots;

a plurality of switching elements and each of said plurality of switching elements comprises means responsive to an internally stored input address word and said time slot numbers for designating one to a plurality of said input time slots of a single time frame;

means responsive to each designated one of said input time slots of said single time frame for buffering data of said designated one of said input time slots where said buffering means has the capacity to retain data from only one input time slot at a time;

means responsive to an internally stored output address word and said time slot numbers for designating one to a plurality of said output time slots of said single time frame to transmit said buffered data in said designated one of said output time slots.

2. The apparatus of claim 1 wherein said input time slot designating means comprises means for storing said stored input address word to generate a plurality of addressing positions with each position representing one of three states;

each of said time slots numbers having a plurality of positions with each having one of two states;

said input time slot designating means further comprises means for matching each of the first two states of said stored input address word individually with one of the two states of said time slots numbers and for matching the third state of said stored input address word with both of said states of said time slots numbers; and means responsive to all of input time slots having a time slot number matching all of said addressing positions of said stored input address word for designating all of such input time slots.

3. The apparatus of claim 2 wherein said stored input address word has two bits per address position to represent said three states and said input address word storing means further comprises a register for storing said stored input address word.

4. The apparatus of claim 3 wherein said input address word storing means only stores said third state in consecutive addressing positions thereby making said designated time slots equally space in time from each other.

5. The apparatus of claim 4 wherein said consecutive addressing positions are from a least significant position of said register.

6. The apparatus of claim 4 wherein said consecutive addressing positions are from a most significant position of said register.

7. The apparatus of claim 2 wherein said input address word storing means comprises a register having sufficient bits for storing said input address word plus a significant bit to define a start of said third state thereby each of said address positions corresponds to one of said bits storing said input address word; and a logic means responsive to said significant bit having a predefined state for generating said third state for each address position corresponding to each sequential bit of said register from said significant bit until a bit is encountered that is not storing the predefined state.

8. The apparatus of claim 7 wherein said significant bit is the most significant bit.

9. The apparatus of claim 7 wherein said significant bit is the least significant bit.

10. The apparatus of claim 1 wherein said output time designating means comprises means, for storing to said stored output address word to generate a plurality of addressing positions with each position representing one of three states;

each of said time slots numbers having a plurality of positions with each having one of two states;

said output time slot designating means further comprises means for matching each of the first two states of said stored output address word means individually with one of the two states of said time slots numbers and for matching the third state of said stored output address word with both of said states of said time slots numbers; and means responsive to all of output time slots having a time slot number matching all of said addressing positions of said stored output address word for designating all of such output time slots.

11. The apparatus of claim 10 wherein said stored output address word has two bits per address position to represent said three states and said output address word storing means comprises a register for storing said stored output address word.

12. The switching element of claim 11 wherein said output time slots storing means only stores said third state in consecutive addressing positions thereby making said designated time slots equally space in time from each other.

13. The switching element of claim 12 wherein said consecutive addressing positions are from a least significant position of said register.

14. The switching element of claim 12 wherein said consecutive addressing positions are from a most significant position of said register.

15. The switching element of claim 10 wherein said output address word storing means comprises a register having sufficient bits for storing said stored output address word plus a significant bit to define a start of said third state whereby each of said address positions corresponds to one of said bits storing said output address word; and a logic means responsive to said significant bit having a predefined state for generating said third state for each address position corresponding to each sequential bit of said register from said significant bit until a bit is encountered that is not storing the predefined state.

16. The switching element of claim 15 wherein said significant bit is the most significant bit.

17. The switching element of claim 15 wherein said significant bit is the least significant bit.

18. An apparatus for switching channels received via an input link to a plurality of output links and each of said channels is communicated to said apparatus via said input link by input time slots of a single time time frame and each of said channels communicated from said apparatus via said output links by output time slots of said single time frame, said apparatus comprising:

means for generating time slots numbers to identify said input time slots and said output time slots;

a plurality of switch elements each having an input port and an output port;

means for connecting the input port of each of said plurality of switch elements to said input link and an individual one of said output links to an individual output port of one of said plurality of switch elements;

each of said plurality of switch elements comprises means responsive to an input address word and to said time slot numbers for designating a subset of said input time slots communicating one of said channels where one of said plurality of switch elements responds to a different number of input time slots than another one of said plurality of switch elements;

means responsive to each time slot of designated subset of said input time slots for buffering data of each time slot of said designated subset of said input time slots where said buffering means only has the capacity to retain data from only one input time slot at a time;

means responsive to an output address word and to said time slot numbers for designating a subset of said output time slots to communicate said data from said buffering means to the output link connected to said output port of each of said plurality of switch elements whereby the number of output time slots in said subset of said output time slots equals the number of input time slots in said subset of input time slots for each of said plurality of switch elements; and means responsive to each time slot of said designated subset of said output time slots for communicating said data from said buffering means to the output link connected to said output port of each of said plurality of switch elements in each time slot of said designated subset of said output time slots thereby communicating one of said channels on said connected output link.

19. The apparatus of claim 18 wherein said data is one binary bit.

20. The apparatus of claim 18 wherein said input time slots designating means comprises means for storing said input address word and for generating a plurality of addressing positions with each of said position representing one of three states;

each of said time slots numbers having a plurality of positions with each position having one of two states;

means for matching each of the first two states of said input address word storing means individually with one of the two states of said time slots numbers and for matching the third state of said input address word storing means with both of said states of said time slots numbers; and means responsive to all of input time slots having a time slot number matching all of said addressing positions of said input address word storing means for including all of such input time slots in said designated subset of input time slots.

21. The switching element of claim 20 wherein said input address word has two bits per address position to represent said three states and said input address word storing means comprises a register for storing said input address word.

22. The apparatus of claim 21 wherein said input time slots storing means only stores said third state in consecutive addressing positions whereby said designated time slots are equally space in time from each other.

23. The apparatus of claim 22 wherein said consecutive addressing positions are from a least significant position of said input time slot address storing means.

24. The apparatus of claim 22 wherein said consecutive addressing positions are from a most significant position of said input time slot address storing means.

25. The switching element of claim 20 wherein said input address word storing means comprises a register having sufficient bits for storing said input address word plus a significant bit to define a start of said third state whereby each of said address positions corresponds to one of said bits storing said input address word; and a logic means responsive to said significant bit having a predefined state for generating said third state for each address position corresponding to each sequential bit of said register from said significant bit until a bit is encountered that is not storing the predefined state.

26. The switching element of claim 25 wherein said significant bit is the most significant bit.

27. The switching element of claim 25 wherein said significant bit is the least significant bit.

28. The apparatus of claim 18 wherein said output time slots designating means comprises means for storing said output address word and for generating a plurality of addressing positions with each of said position representing one of three states;

each of said time slots numbers having a plurality of positions with each position having one of two states;

means for matching each of the first two states of said output address word storing means individually with one of the two states of said time slots numbers and for matching the third state of said output address word storing means with both of said states of said time slots numbers; and means responsive to all of output time slots having a time slot number matching all of said addressing positions of said output address word storing means for including all of such output time slots in said designated subset of output time slots.

29. The switching element of claim 28 wherein said output address word has two bits per address position to represent said three states and said output address word storing means comprises a register for storing said output address word.

30. The apparatus of claim 29 wherein said output time slots storing means only stores said third state in consecutive addressing positions whereby said designated time slots are equally space in time from each other.

31. The apparatus of claim 30 wherein said consecutive addressing positions are from a least significant position of said output time slot address storing means.

32. The apparatus of claim 30 wherein said consecutive addressing positions are from a most significant position of said output time slot address storing means.

33. The switching element of claim 30 wherein said output address word means comprises a register having sufficient bits for storing said output address word plus a significant bit to define a start of said third state whereby each of said address positions corresponds to one of said bits storing said output address word; and a logic means responsive to said significant bit having a predefined state for generating said third state for each address position corresponding to each sequential bit of said register from said significant bit until a bit is encountered that is not storing the predefined state.

34. The switching element of claim 33 wherein said significant bit is the most significant bit.

35. The switching element of claim 33 wherein said significant bit is the least significant bit.

36. An apparatus for switching channels received via a plurality of input links to an output link and each of said channels communicated to said apparatus via said plurality of input links by input time slots of a single time frame and each of said channels communicated from said apparatus via said output link by output time slots of said single time frame, said apparatus comprising:

means for generating time slots numbers to identify said input time slots and said output time slots;

a plurality of switch elements each having an input port and an output port;

means for connecting the output port of each of said plurality of switch elements to said output link and an individual one of said input links to an individual input port of one of said plurality of switch elements;

each of said plurality of switch elements comprises means responsive to an input address word and to said time slot numbers for designating a subset of said input time slots communicating one of said channels where one of said plurality of switch elements responds to a different number of input time slots than another one of said plurality of switch elements;

means responsive to each time slot of said designated subset of said input time slots for buffering data of each time slot of said designated subset of said input time slots where said buffering means only has the capacity to retain data from one input time slot at a time;

means responsive to an output address word and to said time slot numbers for designating a subset of said output time slots to communicate said data from said buffering means to said output link connected to said output port of each of said plurality of switch elements whereby the number of output time slots in said subset of said output time slots equals the number of input time slots in said subset of input time slots for each of said plurality of switch elements; and means responsive to each time slot of said designated subset of said output time slots for communicating said data from said buffering means to said output link connected to said output port of each of said plurality of switch elements in each time slot of said designated subset of said output time slots thereby communicating one of said channels on said connected output link.

37. The apparatus of claim 36 wherein said data is one binary bit.

38. The apparatus of claim 36 wherein said input time slots designating means comprises means for storing said input address word and for generating a plurality of addressing positions with each of said position representing one of three states;

each of said time slots numbers having a plurality of positions with each position having one of two states;

means for matching each of the first two states of said input address word storing means individually with one of the two states of said time slots numbers and for matching the third state of said input address word storing means with both of said states of said time slots numbers; and means responsive to all of input time slots having a time slot number matching all of said addressing positions of said input address word storing means for including all of such input time slots in said designated subset of input time slots.

39. The switching element of claim 38 wherein said input address word has two bits per address position to represent said three states and said input address word storing means comprises a register for storing said input address word.

40. The apparatus of claim 39 wherein said input time slots storing means only stores said third state in consecutive addressing positions whereby said designated time slots are equally space in time from each other.

41. The apparatus of claim 40 wherein said consecutive addressing positions are from a least significant position of said input time slot address storing means.

42. The apparatus of claim 40 wherein said consecutive addressing positions are from a most significant position of said input time slot address storing means.

43. The switching element of claim 38 wherein said input address word storing means comprises a register having sufficient bits for storing said input address word plus a significant bit to define a start of said third state whereby each of said address positions corresponds to one of said bits storing said input address word; and a logic means responsive to said significant bit having a predefined state for generating said third state for each address position corresponding to each sequential bit of said register from said significant bit until a bit is encountered that is not storing the predefined state.

44. The switching element of claim 43 wherein said significant bit is the most significant bit.

45. The switching element of claim 43 wherein said significant bit is the least significant bit.

46. The apparatus of claim 36 wherein said output time slots designating means comprises means for storing said output address word and for generating a plurality of addressing positions with each of said position representing one of three states;

each of said time slots numbers having a plurality of positions with each position having one of two states;

means for matching each of the first two states of said output address word storing means individually with one of the two states of said time slots numbers and for matching the third state of said output address word storing means with both of said states of said time slots numbers; and means responsive to all of output time slots having a time slot number matching all of said addressing positions of said output address word storing means for including all of such output time slots in said designated subset of output time slots.

47. The switching element of claim 46 wherein said output address word has two bits per address position to represent said three states and said output address word storing means comprises a register for storing said output address word.

48. The apparatus of claim 47 wherein said output time slots storing means only stores said third state in consecutive addressing positions whereby said designated time slots are equally space in time from each other.

49. The apparatus of claim 48 wherein said consecutive addressing positions are from a least significant position of said output time slot address storing means.

50. The apparatus of claim 48 wherein said consecutive addressing positions are from a most significant position of said output time slot address storing means.

51. The switching element of claim 46 wherein said output address word storing means comprises a register having sufficient bits for storing said output address word plus a significant bit to define a start of said third state whereby each of said address positions corresponds to one of said bits storing said output address word; and
 a logic means responsive to said significant bit having a predefined state for generating said third state for each address position corresponding to each sequential bit of said register from said significant bit until a bit is encountered that is not storing the predefined state.

52. The switching element of claim 51 wherein said significant bit is the most significant bit.

53. The switching element of claim 51 wherein said significant bit is the least significant bit.

54. A method for transferring data from input time slots to output time slots communicated in time frames with said input time slots and said output time slots being identified by time slots numbers, said method comprising the steps of:
 storing an input address word;
 designating one to a plurality of said input time slots of a single time frame in response to said stored input address word and said time slot numbers;
 buffering data of said designated one of said input time slots in response to each designated one of said input time slots of said single time frame where said buffering step has the capacity to retain data from only one input time slot at a time;
 storing an output address word;
 designating one to a plurality of said output time slots of said single time frame in response to said stored output address word and said time slots numbers; and
 transmitting said buffered data in said designated one of said output time slots in response to each designated one of said output time slots of said single time slot.

55. The method of claim 54 wherein said input address word storing step generates a plurality of addressing positions with each position representing one of three states;
 each of said time slots numbers having a plurality of positions with each having one of two states;
 said input time slots designating step comprises the step of matching each of the first two states of said input time slots storing step individually with one of the two states of said time slots numbers and for matching the third state of said input time slots storing step with both of said states of said time slots numbers; and
 designating all of such input time slots in response to all of input time slots having a time slot number matching all of said addressing positions of said input address word storing step.

56. The method of claim 55 wherein said input address word has two bits per address position to represent said three states.

57. The method of claim 56 wherein said input time slots storing step only stores said third state in consecutive addressing positions thereby making said designated time slots equally space in time from each other.

58. The method of claim 57 wherein said consecutive addressing positions are from a least significant position of said stored input address word.

59. The method of claim 57 wherein said consecutive addressing positions are from a most significant position of said stored input address word.

60. The method of claim 55 wherein said input address word step comprises the steps of storing said input address word in a register having sufficient bits to store said input address word plus a significant bit to define a start of said third state whereby each of said address positions corresponds to one of said bits storing said input address word; and
 generating in response to said significant bit having a predefined state said third state for each address position corresponding to each sequential bit of said register from said significant bit until a bit is encountered that is not storing the predefined state.

61. The method of claim 60 wherein said significant bit is the most significant bit.

62. The method of claim 60 wherein said significant bit is the least significant bit.

63. A method for switching channels received by a switching unit via an input link to a plurality of output links and each of said channels communicated to said switching unit via said input link by input time slots of a single time frame and each of said channels communicated from said switching unit via said output links by output time slots of said single time frame and said switching unit having a plurality of switch elements each having an input port interconnected to said input link and an output port interconnected to an individual one of said output links, said method comprising the steps of:
 generating time slots numbers to identify said input time slots and said output time slots;
 designating a subset of said input time slots communicating one of said channels by each of said plurality of switch elements in response to an input address word to said time slot numbers where one of said plurality of switch elements responds to a different number of input time slots than a subset of another one of said plurality of switch elements;
 buffering data of each time slot of said designated subset of said input time slots where said buffering means only has the capacity to retain data from only one input time slot at a time;
 designating in response to an output address word and to said time slot numbers a subset of said output time slots to communicate said data from said buffering means to the output link connected to said output port of each of said plurality of switch elements whereby the number of output time slots in said subset of said output time slots equals the number of input time slots in said subset of input time slots for each of said plurality of switch elements; and
 communicating said data from said buffering means to the output link connected to said output port of each of said plurality of switch elements in each time slot of said designated subset of said output time slots thereby communicating one of said channels on said connected output link.

64. The method of claim 63 wherein said data is one binary bit.

65. A method for switching channels received by a switching unit via a plurality of input links to an output link and each of said channels communicated to said by a switching unit via said plurality of input links by input time slots of a single time frame and each of said channels communicated from said switching unit via said output link by output time slots of said single time frame and said switching unit having a plurality of switch elements each having an input port interconnected to an individual one of said input links and an output port interconnected to said output link, said method comprising the steps of:

generating time slots numbers to identify said input time slots and said output time slots;

designating a subset of said input time slots communicating one of said channels by each of said plurality of switch elements in response to an input address word to said time slot numbers where one of said plurality of switch elements responds to a different number of input time slots than a subset of another one of said plurality of switch elements;

buffering data of each time slot of said designated subset of said input time slots where said buffering means only has the capacity to retain data from only one input time slot at a time;

designating in response to an output address word and to said time slot numbers a subset of said output time slots to communicate said data from said buffering means to said output link connected to said output port of each of said plurality of switch elements whereby the number of output time slots in said subset of said output time slots equals the number of input time slots in said subset of input time slots for each of said plurality of switch elements; and communicating said data from said buffering means to said output link connected to said output port of each of said plurality of switch elements in each time slot of said designated subset of said output time slots thereby communicating one of said channels on said connected output link.

66. The method of claim 65 wherein said data is one binary bit.

* * * * *